July 9, 1935.    T. FRASER    2,007,190
PROCESS OF AND APPARATUS FOR SEPARATING MIXED MATERIALS
Filed Dec. 21, 1931    2 Sheets-Sheet 1
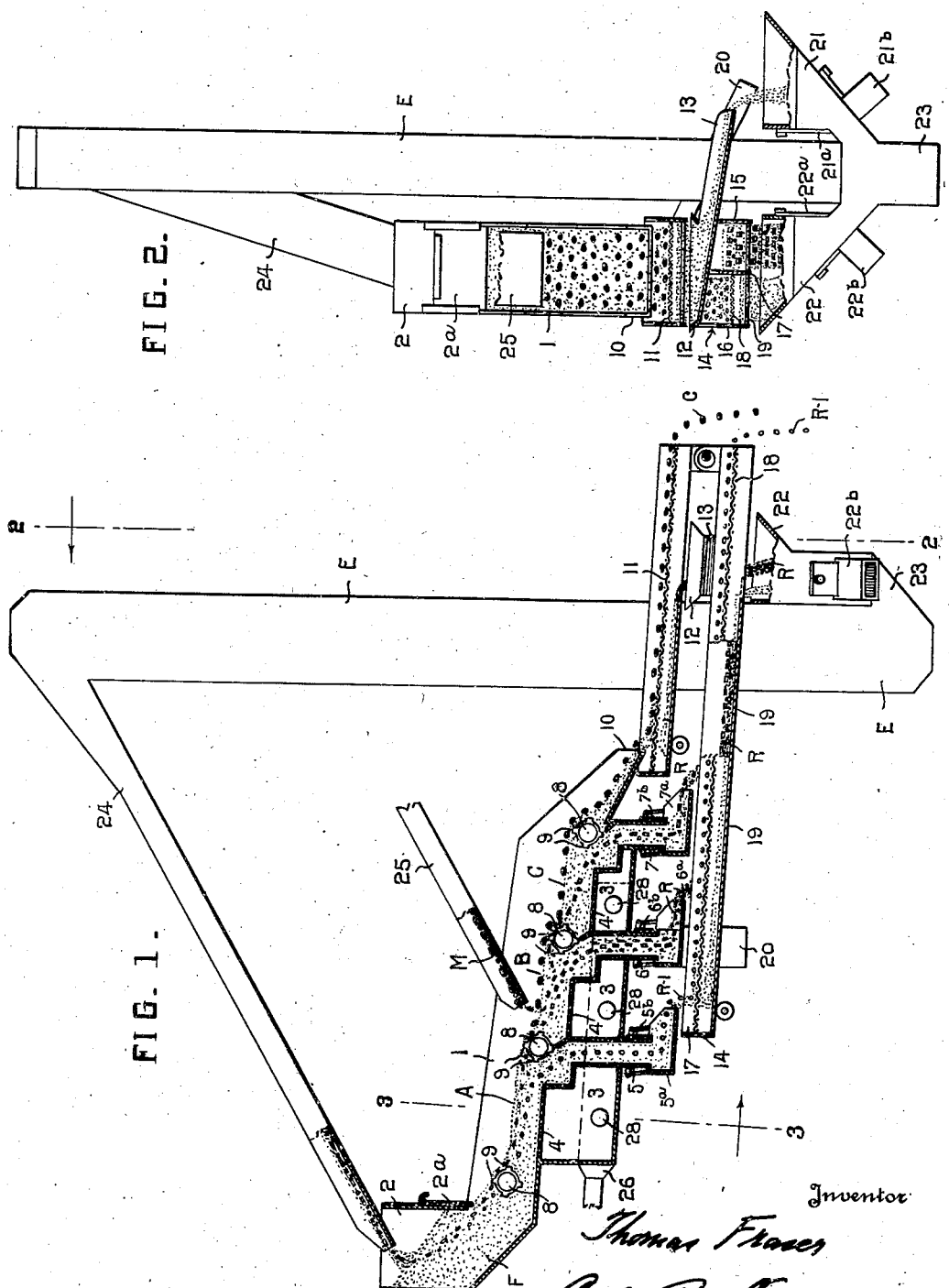

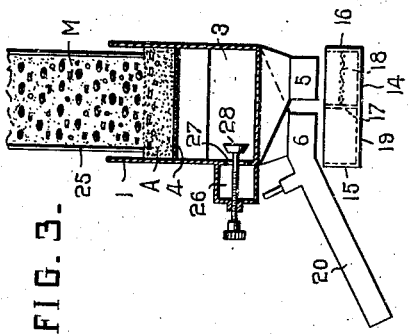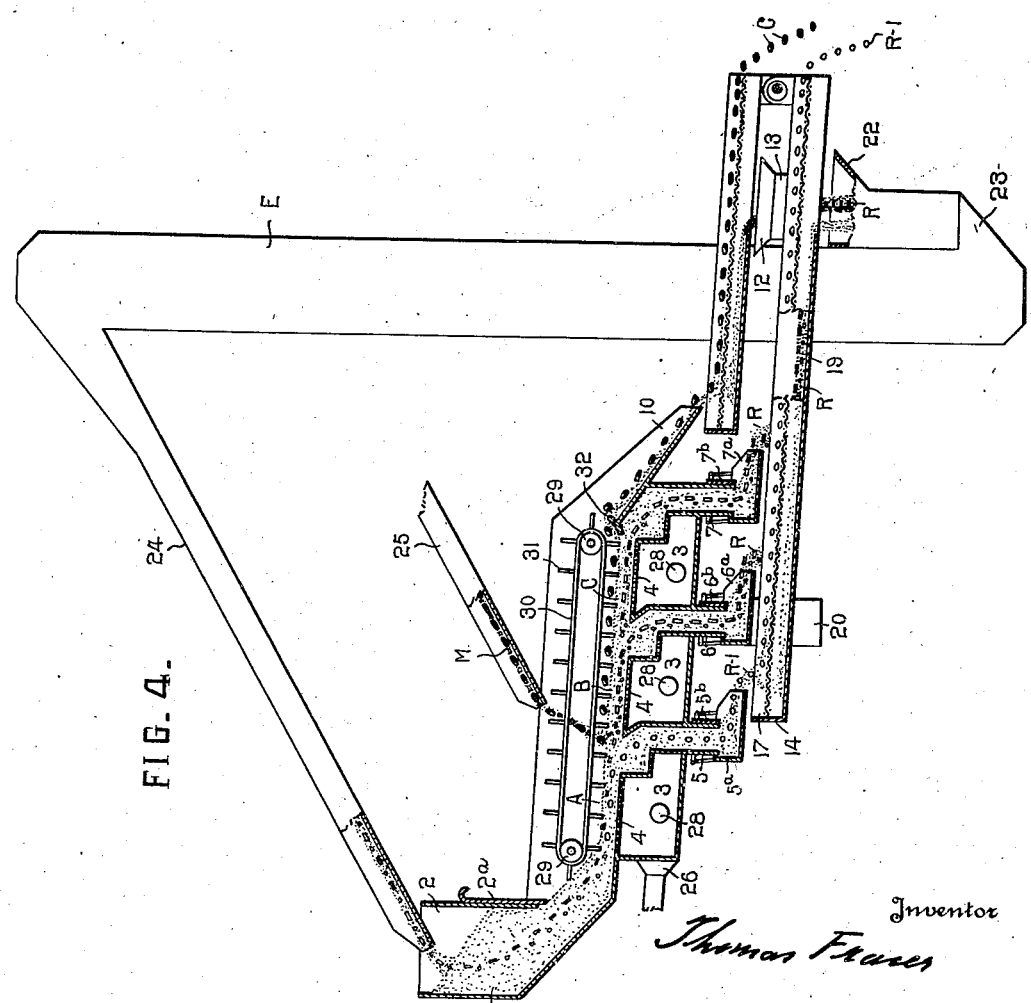

Patented July 9, 1935

2,007,190

UNITED STATES PATENT OFFICE 2,007,190

PROCESS OF AND APPARATUS FOR SEPARATING MIXED MATERIALS

Thomas Fraser, Pittsburgh, Pa.

Application December 21, 1931, Serial No. 582,471

11 Claims. (Cl. 209—474)

My invention consists in a new and useful improvement in process of and apparatus for separating mixed materials, and is intended more particularly for cleaning coal by separating it from the refuse with which it is commingled, but may be used for separating two or more materials of differing specific gravities. My improved process consists in forming a dry fluid medium by bubbling air up through fine granular material, and using this medium to float the lighter particles of the mixed materials, and allow the heavier particles to sink therethrough, thereby bringing about a separation of the two groups of particles, one group being lighter than the aerated fluid medium and the other group heavier. It is necessary for the successful operation of this process that a sufficient quantity of the fine granular material be present to form a fluid bed for the separation of the larger particles as described above. To maintain at all times a constant supply of this sand-size material, the separated products are passed over de-sanding screens which will pass the fine material of suitable size to form the separating medium. This material is then returned to my apparatus by means of a return elevator.

This separating process, invented by me, is fully described and claimed in United States Letters Patent Number 1,801,195 granted April 14, 1931 to my assignee. The process which I disclose in this application and for which I now seek patent protection is a novel and useful improvement upon my aforesaid patented process, in which there are definite combinations of a plurality of the single separating operations heretofore disclosed, in one continuous operation with a single flowing stream of the separating medium and the re-circulation of certain portions of the feed, in the series of separating operations. In my present improvement, the sand-size material returned from each of the two products passes separately through two control hoppers respectively, provided with overflows to discharge surplus fine material from the system and maintain in the circuit the proper amount of fine material to form the separating medium. My object is to accomplish two or more stages of the separating action with one continuous flow of the separating medium requiring only one elevating operation.

The practical advantages of my improved process, herein disclosed, over my former patented process, are:

1. The mixed materials are more completely separated than in my single-stage process.

2. The raw materials subjected to my process may be separated into more than two products, which would be advantageous in the event that the natural raw material contains three different substances of differing specific gravities.

3. The multiple-stage separation provided in this process automatically cares for any fluctuations in the proportion of light and heavy material in the feed. The practical application of this in coal cleaning may be illustrated as follows:

Raw coal coming from the mine, for example, may contain an average of about 10% refuse which is the heavy sinking product. This raw coal as mined varies greatly in refuse content, so that some coal may be dumped into the separating apparatus which contains 20% of refuse. Under such a condition, with only one cleaning operation, no doubt part of this refuse would remain in the cleaned coal, but with my improved multi-stage operation, such refuse as can not be separated in one stage would then be removed in a later stage.

4. The several operations of separating are all accomplished by one continuous flow of the separating medium through the apparatus, and it is thus obvious that my improved process is not merely a duplication of my formerly disclosed process, but is a continuous process in which the inter-relation of the different stages and the recirculation of the separating medium and portions of the feed constitute an essential feature of the practice of the process.

In the drawings filed herewith, I have illustrated one specific embodiment of my improved apparatus by which my improved process can be practiced, and I have hereinafter fully described said specific embodiment and disclosed and fully described my improved process, but it is to be distinctly understood that I do not consider my invention of the improved process and apparatus to be limited by the specific embodiment thereof herein disclosed but refer for its scope to the claims appended hereto.

In the drawings:

Fig. 1 is a longitudinal vertical section of my apparatus.

Fig. 2 is a vertical section on the line 2—2 of Fig. 1.

Fig. 3 is a vertical section on the line 3—3 of Fig. 1.

Fig. 4 is a longitudinal vertical section of a modified form of my apparatus.

As illustrated in the drawings, my improved apparatus by which I can practice my improved process has the trough-like receptacle 1 at the rear end of which is the hopper 2 with gate 2—a. Beneath the receptacle 1 there are three air boxes 3 and between these boxes 3 and the receptacle 1 there are provided the porous plates 4. At the front edges of these plates 4, I provide the discharge chutes 5, 6 and 7 respectively, provided with the shaker pans 5—a, 6—a and 7—a, and the control gates 5—b, 6—b and 7—b, respectively. Between the receptacle 1 and the hopper 2 and at points immediately in front of the chutes 5, 6 and 7 in the receptacle 1, I provide rollers 8 with vanes 9 extending laterally of the receptacle 1. From the foregoing, it will be seen that the receptacle 1 is divided into the compartments A, B and C. I provide a discharge chute 10 from the receptacle 1 at its front end. It is to be noted that the compartments A, B and C are gradiently disposed so that the bottom plates 4 of the receptacle 1 are stepped down from the hopper 2 to the chute 10.

Suitably disposed below the chute 10, I provide a shaker screen 11 beneath which is the hopper 12 with discharge chute 13. Below the discharge chutes 5, 6 and 7, I provide the oscillating chute 14 having the side walls 15 and 16 and the longitudinally disposed middle wall 17. Between the walls 16 and 17, I provide the screen 18, and it is to be noted (Fig. 3) that the discharge chute 5 is so disposed as to discharge material onto the screen 18, while the discharge chutes 6 and 7 are so disposed as to discharge material therefrom onto the bottom 19 of the chute 14. In connection with the chute 6, I provide also a separate controlled discharge chute 20.

To convey away the materials discharged over the screens 11 and 18, any suitable conveyor means (not shown) may be provided.

Below the discharge chute 13, I provide a hopper 21 and below the chute 14, I provide a hopper 22, both of which hoppers are so disposed as to discharge into the chute 23 to the bottom of the elevator E. I provide gates 21—a and 22—a for the hoppers 21 and 22 respectively, so that the discharge of material from the hoppers 21 and 22 into the elevator E may be controlled. I also provide controlled discharge chutes 21—b and 22—b for the hoppers 21 and 22 respectively, by means of which material may be evacuated from the hoppers 21 and 22, as may be desired.

From the upper discharge end of the elevator E, I provide a chute 24 having its discharge end so disposed as to discharge material into the hopper 2.

Suitably disposed above the compartment B, I provide a supply chute 25 by means of which I am able to introduce the mixed materials into my apparatus. While the supply chute 25 is illustrated in the drawings as disposed above the compartment B so as to introduce the mixed materials into compartment B, it is to be understood that I may so design the chute 25 as to be adjustable to introduce the mixed materials into any one of the compartments A, B or C.

To convey the air under pressure to the air boxes 3, I provide the conduit 26 and provide each of the boxes 3 with a port 27 communicating with this conduit 26 and provide a controlled valve 28 for each port 27 by means of which I am enabled to control the air pressure in each box 3.

In the modified form of my apparatus illustrated in Fig. 4, the three bottom plates 4 of the receptacle 1 are disposed in the same horizontal plane, and I provide in the receptacle 1 pulleys 29 driven by any suitable means and having thereon a belt 30 with scraper blades 31 extending laterally of the receptacle 1, and an arcuate feed plate 32 at the forward end of the receptacle 1 adjacent the upper end of the discharge chute 10.

From the foregoing description of the details of construction of my improved apparatus its use in the practice of my improved process will be obvious. The mixed materials M, such as coal and slate, are fed into compartment B of the receptacle 1 of my apparatus by the chute 25 and are deposited upon the bed of sand F flowing by gravity from the hopper 2 and filling the receptacle 1. Air under pressure from the conduit 26 passes from the air boxes 3 through the porous plates 4. These porous plates 4 distribute the air uniformly in fine bubbles through the sand F in the receptacle 1, the sand F being thereby fluidized. The lighter material c, such as coal, floats in the sand F and passes out of the receptacle 1 through the chute 10, and such of the sand F as passes out therewith is recovered through the screen 11 and passes through hopper 12 and chute 13 to the hopper 21, while the coal c flowing over the screen 11 is conveyed away from my apparatus by any suitable means. The heavier material R, such as slate, sinking through the sand F in compartment B passes out through the discharge chute 6 and its shaker pan 6—a to the chute 14 and into the hopper 22 with a certain amount of sand F which escapes therewith. By the proper adjustment of the gates 21—a and 22—a, the sand F in the hopper 21 and the mixture of heavier material R and sand F in the hopper 22 may be permitted to flow through the chute 23 into the elevator E by which they are raised to the chute 24 and thereby introduced into the hopper 2 whence the heavier material R passes into compartment A of the receptacle 1 where the heavier material R is subjected to a second separating operation in the fluidized sand F therein. By means of the gates 21—a and 22—a, and the gate 2—a of the hopper 2, the volume of sand F in the receptacle 1 and the rate of supply of the sand F may be regulated to suit the feed and maintained at the necessary adjustment. In this second cleaning operation the heavier material R—1 passes down through the chute 5 onto the screen 18, and such of the sand F as escapes therewith passing through the screen 18 is discharged by the chute 14 into the hopper 22, while the material R—1 passing over the screen 18 is conveyed away from my apparatus by any suitable means.

It will be seen from the foregoing that the final refuse R—1 discharged from compartment A through chute 5 is disposed of and such of the material R as does not sink in the compartment A passes into compartment B and is subjected to another separating operation.

It is also obvious that the lighter material C which passes from compartment B to compartment C is again subjected to the cleaning operation, such of the heavier material R as flows over into compartment C passing out through chute 7 along with the material R from chute 6 to the hopper 22.

The operation of rollers 8 and their vanes 9 to forward the floated material C, as illustrated in Fig. 1, and the operation of the scraper blades 31, as illustrated in Fig. 4, is obvious.

From the foregoing description of the operation of my apparatus, it will be seen that when a mixture of coal c and slate R is fed into compartment B of the receptacle 1, the coal c is cleaned in compartment B and passing over into compartment C is there re-cleaned. The discharged slate refuse R is conveyed to compartment A and is there re-cleaned, and the final refuse R—I is disposed of from the compartment A. Thus it is apparent that by the use of my improved apparatus, there are three distinct cleaning operations. The most easily floated particles of coal c are removed from the mixture M in compartment B in the first treatment. However there will be a portion of the mixture M of coal c and slate R unseparated which will pass over into compartment C. Here this mixture M is re-cleaned. A discharge of clean coal c is thus secured from compartment B and C through chute 10.

The discharge of the slate R from compartments B and C is then re-treated in compartment A where the final refuse R—I is removed and such of the particles of coal c as have not been previously removed, passing again through compartments B and C, are finally cleaned and discharged through chute 10.

The use of the separate discharge chute 20 on chute 6 makes it possible to separately utilize the discharge from chutes 6 and 7 respectively, as may be desired.

It is obvious that if the supply chute 25 is adjusted to deliver the mixed materials M to compartment A, the lighter material c is treated in all three of the compartments A, B and C, and if it is adjusted to deliver to compartment C, then the heavier material R is re-treated in both compartments A and B.

While I have heretofore described my process of separating coal and refuse by the use of sand as the fluid medium, it is to be understood that when the feed M of mixed materials contains a proportion of fine material of suitable size and specific gravity to form the fluid medium, the use of the sand may be dispensed with after a sufficient quantity of the fine material has been accumulated to provide the fluid medium.

In this form of my process, viz. the use of the fines of the mixed materials as the fluid medium, the feed M is introduced by the chute 25 into the receptacle 1, the fine slate R flowing out through chute 14 and hopper 22 to the elevator E is supplied to the hopper 2 and feed therefrom to the receptacle 1 again. The fine particles of coal c will float out through chute 10, and passing through screen 11, hopper 12 and chute 13 to the hopper 21, will be returned by the elevator E to the hopper 2 and feed to the receptacle 1 again. Thus it will be seen that the fine materials of the feed M are in a closed circuit and thereby retained in the system to supply the fluid medium.

It is obvious that in this form of my process the hopper 21 will receive the fine coal particles c and the hopper 22 will receive the fine slate particles R. By the proper control of the discharges of the materials from the hoppers 21 and 22 to the elevator E, through the hopper 2 to the receptacle 1, the desired proportion between the mass of fine coal c and the mass of fine slate R may be maintained in the receptacle 1. The control gate 2—a of the hopper 2 makes possible the control of the amount of the fine materials supplied to the receptacle 1, so that the proper proportion of the fine materials to be present in the receptacle 1 to form the fluid medium bed for the treatment of the feed M, is constantly maintained.

Having described my invention, what I claim is:

1. The process of separating mixed materials of different specific gravities which consists in producing a flowing mass composed of individually moving dry particles of each material separated from the mixture, and commingled in proportions to determine the desired specific gravity of said mass, and introducing the materials into said mass.

2. The process of separating mixed materials of different specific gravities which consists in subjecting the materials to the buoyant effect of a fluid medium produced by commingling in proportions to determine the desired specific gravity of said medium fine particles of each material separated from the mixture, and to the segregating effect of translating motion imparted to the mass formed by the materials in the medium.

3. The process of separating mixed materials which consists in producing a flowing mass composed of individually moving dry particles, introducing the materials into said mass, removing from the mass such of one of the mixed materials as has been separated from the other materials, removing from the mass the balance of the mixed materials; recovering such of the dry particles as escape by reason of said removals and re-introducing them into the mass; re-introducing the treated mixed materials into said mass; removing from the mass such of the other one of the mixed materials as has been separated; and recovering such of the dry particles as escape by reason of said removal and returning them to the mass.

4. The process of separating coal from its associated refuse which consists in fluidizing a flowing mass of sand by air under pressure; commingling the mixture of coal and refuse with said mass; removing the separated coal from the mass; removing the treated mixture of coal and refuse from the mass; screening from the removed separated coal such of the sand as escapes with the coal; returning the screened sand and the mixture of coal and refuse with such sand as escapes therewith to the flowing mass; removing the re-treated refuse from the mass; screening from the re-treated refuse such of the sand as escapes therewith; and returning the screened sand to the flowing mass.

5. The process of separating coal from its associated refuse which consists in fluidizing by air under pressure a flowing mass composed of fine particles of coal and refuse screened from the feed; commingling the mixture of coal and refuse with said mass; removing the separated coal from the mass; removing the treated mixture of coal and refuse from the mass; screening from the removed separated coal such of the particles of the fluid mass as escapes with the coal; returning the screened particles and the mixture of coal and refuse with such of the particles of the fluid mass as escapes with the mixture of coal and refuse to the mass; removing the re-treated refuse from the mass; screening from the re-treated refuse such of the particles of the mass as escape therewith; and returning the screened particles to the mass.

6. The process of separating mixed materials which consists in producing a flowing mass composed of individually moving dry particles, introducing the materials into said mass, removing from the mass such of one of the mixed materials as has been separated from the other materials, recovering such of the dry particles as escape by reason of said removal and re-introducing them into the mass, removing from the mass the balance of the mixed materials, re-introducing the treated mixed materials into said mass, removing from the mass such of the other one of the mixed materials as has been separated, and recovering such of the dry particles as escape by reason of said removal and returning them to the mass.

7. The process of separating mixed materials of different specific gravities which consists in producing a bed composed of the fines of the heavy material mixed in the proper proportion with the fines of the light material; fluidizing said bed by air bubbles passed upwardly through said bed thus forming a fluid of such volume as to contain loosely distributed therethrough the coarser particles, maintaining a combination of buoying action, due to the specific gravity of the fluid, and the velocity of flow thereof; and introducing the mixed materials into said fluid to effect the separation of the lighter material from the heavier material.

8. In an apparatus for separating mixed materials, the combination of a chamber having an air-pervious bottom; means for supplying air through said bottom; a chute below said chamber; a longitudinal dividing wall in said chute; a screen between said dividing wall and one side of said chute; a discharge port in said chamber above said screen; a second discharge port in said chamber above the unscreened portion of the chute; and means for conveying material, passing out of said chute, to said chamber.

9. In an apparatus for separating mixed materials, the combination of a chamber having an air-pervious bottom; means for supplying air through said bottom; a chute below said chamber; a longitudinal dividing wall in said chute; a screen between said dividing wall and one side of said chute; a discharge port in said chamber above said screen; a second discharge port in said chamber above the unscreened portion of the chute; a third discharge port in said chamber; a screened chute below said third port; and means for conveying material, passing out of both chutes, to said chamber.

10. In an apparatus for separating mixed materials, the combination of a chamber having an air-pervious bottom; means for supplying air through said bottom; a chute below said chamber; a longitudinal dividing wall in said chute; a screen between said dividing wall and one side of said chute; a discharge port in said chamber above said screen; a second discharge port in said chamber above the unscreened portion of the chute; a third discharge port in said chamber; a screened chute below said third port; a hopper, below said first chute, having two controlled discharge vents; a hopper, below said second chute, having two controlled discharge vents; a third hopper into which one vent of each of the first two hoppers discharges; and elevator from said third hopper; and a chute from the top of said elevator to said chamber.

11. The process of separating mixed materials of different specific gravities which consists in producing a bed of fines removed from the separated materials by mixing the heavy fines in the proper proportion with the lighter fines to secure the desired specific gravity of said bed; fluidizing said bed by means of air bubbles passed upwardly through said bed; causing said bed to flow to create a fluid stream providing the combination of buoying action due to the specific gravity of the fluid mass, and the velocity of flow thereof and introducing the mixed materials into said bed to effect the separation of the lighter material from the heavier material.

THOMAS FRASER.